April 7, 1936.  M. LAZARUS  2,036,707
ELECTRIC CURRENT RECTIFYING DEVICE AND METHOD OF MAKING THE SAME
Filed Sept. 26, 1935
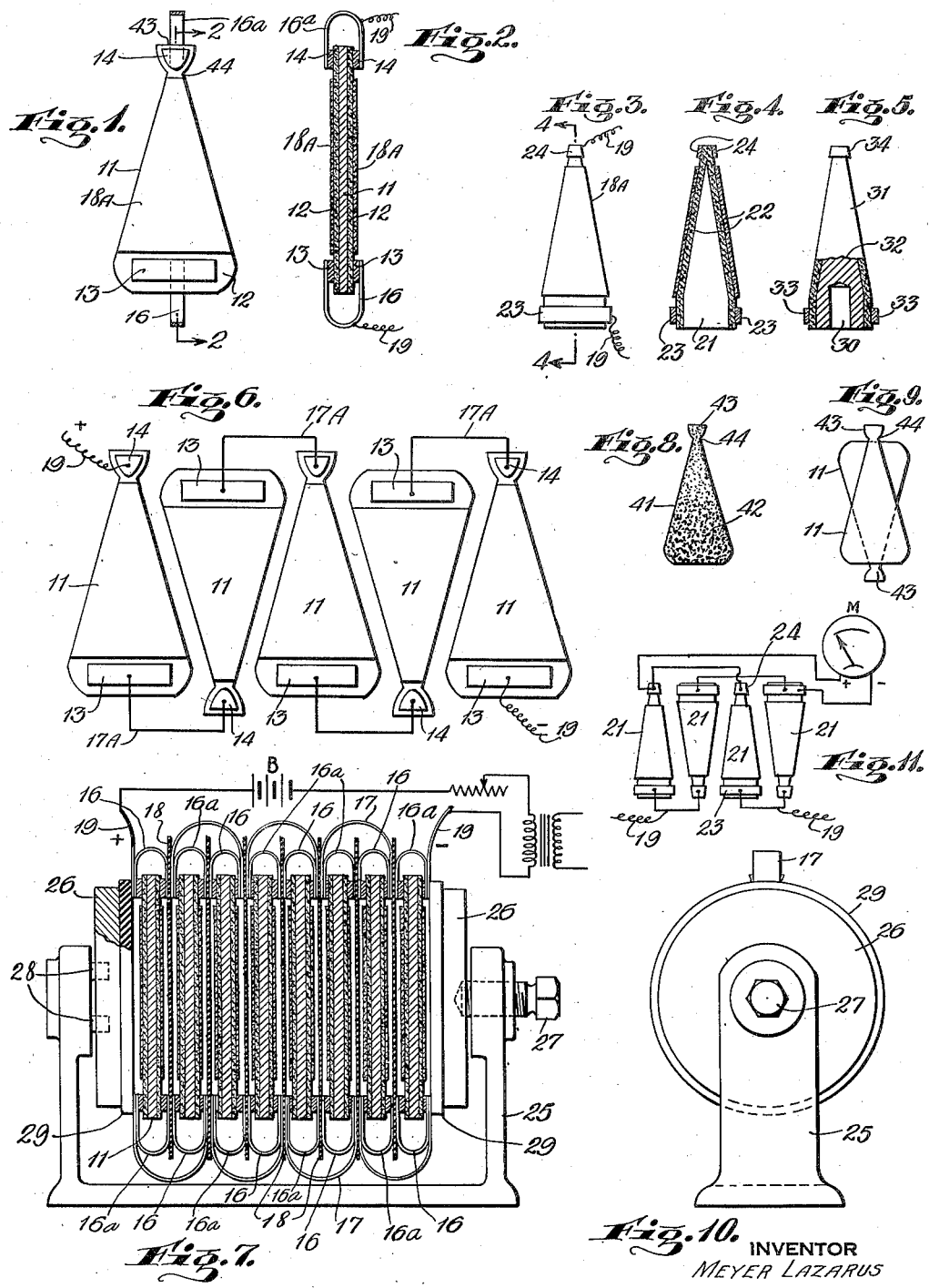
INVENTOR
MEYER LAZARUS
BY
Israel Benjamins.
ATTORNEY Patented Apr. 7, 1936

2,036,707

UNITED STATES PATENT OFFICE 2,036,707

ELECTRIC CURRENT RECTIFYING DEVICE AND METHOD OF MAKING THE SAME

Meyer Lazarus, Brooklyn, N. Y.

Application September 26, 1935, Serial No. 42,204

9 Claims. (Cl. 175—366)

My invention relates to improvements in electric current rectifying devices and the method of making the same, and it consists in the novel features which are hereinafter described.

One of the objects of my invention is to produce a perfected current rectifying device for converting alternating current into direct current.

Another object is to have my rectifying device suitable for charging storage batteries.

A further object of my invention is to have my rectifying device adapted also for small currents, such as for the circuits of electric meters and other electric instruments.

A still other object is to produce a new cuprous oxide rectifying element that will rectify higher voltages, than has been possible heretofore.

Another object is to reduce the ageing of the rectifying device by reducing the number of contacting electrodes which are applied to the cuprous oxide, as is hereinafter described.

A further object of my invention is to reduce to a minimum the stacking of rectifying elements by elongating the elements for an increase in a given voltage.

A still other object is to control the sizes of the crystals of cuprous oxide of my rectifying elements.

Another object is to pass the electric current, which passes through my rectifying device, over an extended distance whereby the elements are enabled to withstand a higher surge without being destroyed or damaged.

A further object is to have my rectifying device compact, simple, durable, rugged and relatively inexpensive.

Other objects and advantages will hereinafter appear.

I attain these objects by the electric current rectifying device and the method of making the same, several forms of which are illustrated in the accompanying drawing, or by any mechanical, physical or electrical equivalents or obvious modifications of the same.

In the drawing Fig. 1 is a front view of an element of one form of my rectifying device.

Fig. 2 is a sectional edge view of the element shown in Fig. 1, on the line 2—2 of Fig. 1.

Fig. 3 is a front elevation of another form of an element of my rectifying device, which comprises a tapered pin.

Fig. 4 is a view on the line 4—4 of Fig. 3 showing the film or layer of cuprous oxide in section; and showing the metal pin, which is hereinafter described, in elevation.

Fig. 5 is an axial section of another form of my rectifying element showing part of the metal pin, which is hereinafter described, in elevation.

Fig. 6 is a front elevation of a series of elements of the form of my rectifying device which is shown in Figs. 1 and 2.

Fig. 7 is a longitudinal axial section of an assembly of elements or stack in the form of my rectifying device which is shown in Figs. 1 and 2.

Fig. 8 is a front elevation of an element, such as shown in Figs. 1 and 2, showing the gradual decrease in the size of the crystals of the cuprous oxide from the wider end of the element to the narrower end thereof.

Fig. 9 is an end view showing a way of stacking rectifying plates 11, such as shown in Figs. 1 and 2.

Fig. 10 is an end view of the assembly of elements, which is shown in Fig. 7.

Fig. 11 is a side elevation of an assembly of my tapered-pin shaped elements connected in the form of a Wheatstone bridge full wave circuit for supplying unidirectional current to a measuring instrument.

In Figs. 1 and 2, 11 designates a tapered plate, preferably of copper, which is shown as covered on the surfaces 12 of both sides thereof by a film or layer of cuprous oxide.

A copper alloy, such as an alloy of copper and silver or of copper and zinc, may be used instead of copper; the plate 11 will then be covered by a film or layer of the compound of the metal.

Fig. 2 shows also a layer of cupric oxide superimposed over part of the film of cuprous oxide, for a purpose which is hereinafter described.

The surface 12 of only one side of the plate 11 may be covered by a film or layer of cuprous oxide, if desired.

Relatively large contacting electrodes 13 and relatively small contacting electrodes 14 of some soft metal, such as lead or tin, are pressed against portions of the film or layer of cuprous oxide on the surface or surfaces 12 at the opposite ends of the plates 11, for conducting a current therethrough along the film or films of cuprous oxide on the surface or surfaces 12.

Electrodes made of other substances, such as graphite, may be used at the above described portions at the ends of the plate 11.

Part of the cuprous oxide at the surfaces 12 may be also reduced at said portions as by quenching the ends of the plate 11 by means of a reducing reagent such as a solution of alcohol or oil, for said portions to serve as electrodes.

Where both sides of the plates 11 are oxidized

I provide thin metal bands 16, to connect the pairs of electrodes 13 on the opposite sides of the plates 11 at the wide ends thereof and bands 16a to connect the electrodes 14 at the narrow ends of the plates 11, as shown in Figs. 2 and 7.

Metal strips 17 are shown in Fig. 7 as connecting the bands 16 to the bands 16a of adjacent plates 11.

A bracket 25 is shown in Fig. 7 as supporting the assembly of rectifying elements 11—12, which are arranged as in Fig. 9 and are shown as clamped between a pair of terminal plates 26, which may be of iron, by means of a screw 27 at one end of the assembly and a pair of pins 28 at the other end thereof.

Insulating discs 29 are shown in Fig. 7 at the end of the stack, to insulate the latter from the bracket 25 and the plates 26.

Sheets 18 of insulating material are shown in Fig. 7 as placed between adjacent plates 11, with the electrodes 13 and 14 and the bands 16 and 16a thereon.

Instead of employing the sheets 18, the greater part of the surfaces of the plates 11—12 between the electrodes 13 and 14 may be left covered by black cupric oxide 18a, which is shown in Figs. 1 and 2 and is formed thereon during the process of oxidation, and the cupric oxide may be removed from the portions where the electrodes 13 and 14 engage with the cuprous oxide on the plate 11. The bands 16 and 16a may then be insulated from each other by suitable strips of insulating material.

Wire connections 19 are shown as made at the ends of the stack in Fig. 7 and at the end of an element in Figs. 2 and 3.

The connections 19 may be made otherwise than as shown.

When a current is passed through the connection 19 it readily flows along the films of cuprous oxide on each plate 11 from the electrode 13 to the electrode 14; but a flow in the opposite direction is obstructed; whereby an asymmetric effect is produced.

The voltage of my rectifier is governed by the length of the plate 11 of each element and by the number of the elements in series in a stack.

The metal plate 11 of each element serves as a carrier or support for the film or layer of cuprous oxide on the surface 12 of the element.

In the modification of my rectifier, which is shown in Figs. 3 and 4, a tapered pin 21, which is made of an element of copper, is used instead of a plate 11; the pin 21 may be either conical, pyramidal or have any other shape, if desired.

The relatively large electrodes 23 and the relatively small electrodes 24 are applied to portions of the film of cuprous oxide at the two ends of the pin 21, which is covered by said film on the surface 22 thereof.

In the modification of my rectifying device, which is shown in Fig. 5, a pin 31 is employed, which is similar to the pin 21 of Figs. 3 and 4, and is provided at the wide end thereof with a cavity 30, which serves to produce coarser crystals of cuprous oxide on the adjacent surface 32 of the pin 31 when the wide end of the latter is quenched in a cooling fluid.

The crystals on the surface 32 of the pin 31 are thereby arranged in a gradually and successively finer grading of size from the wider end towards the narrower end of the said pin 31.

The electrodes 33 and 34 of Fig. 5 are similar to the electrodes 23 and 24 of Figs. 3 and 4.

Fig. 6 shows a side view of an assembly of rectifying elements 11—12 disposed in series in the same plane. The electrodes 13 of the elements 11—12 are shown as connected to the electrodes 14 of the adjacent elements by means of connecting wires or strips 17a.

The wire connections 19 are attached to the electrical terminals of the series.

Fig. 8 shows the successive gradation of the size of crystals on the surface 42 of an element 41, which is similar to the element 11—12 of Figs. 1 and 2.

The successive grading of the size of crystals on the surface 42 proceeds from the wider end of the element 41 to the narrow end thereof and is produced by first heating the element 41 to a bright red heat, then partly cooling it in air to a desired lower temperature and then quenching the wide end of the element 41 in a cooling liquid leaving the remaining portion of the element to be gradually cooled by the air.

This gradation assists to check the back flow of the current from the narrow end towards the wide end of the element 41.

An ear 43 and a neck 44 are provided at the narrow end of each of the elements 11 and 41 as shown in Figs. 1 and 8; the ear 43 serves as an electric terminal, and is shown as not very large; but I do not restrict myself to the size thereof as shown and the neck 44 is made as small as possible without being overheated by the current flowing therethrough.

Rectification may also be accomplished by the narrow neck 44 near the narrow end of the tapered element 11 or 41 regardless of the relative sizes of the contacting electrodes, to check the back flow of the current into the element.

Fig. 9 shows a way of stacking elements 11—12 of Figs. 1, 2 and 7.

It will be understood that the film or layer of cuprous oxide in all the above described modifications of my rectifying device is too thin to be self sustaining and requires a metal support or carrier; but I do not restrict myself to any particular thickness of the film or layer.

Variations are possible, and parts of my invention may be used without other parts.

I do not, therefore, restrict myself to the details as shown in the drawing.

I claim as my invention and desire to secure by Letters Patent:

1. In an electric current rectifying device a carrier made of a copper element, a layer consisting mainly of cuprous oxide, on the surface of said carrier and contacting electrodes applied to the said layer on the opposite ends of said carrier, one of the said electrodes having a relatively large area of contact with said layer and the other of said electrodes having a relatively small area of contact with said layer, the electrode having the said larger area of contact to receive a current, and the other of said electrodes to discharge the current, and said oxide permitting said current readily to flow from the electrode having the said larger area of contact to the other electrode, and said oxide obstructing the flow of said current in the opposite direction.

2. In an electric current rectifying device a tapered carrier made of a copper element, a layer consisting mainly of cuprous oxide on the surface of said carrier and a pair of contacting electrodes of unequal size applied to the said layer at the opposite ends of said carrier, the relatively large electrode at the wide end of the carrier to receive a current and the relatively small electrode at the narrow end of the carrier to discharge the current, said oxide permitting said current readily to flow from the wide end of the carrier to the narrow end thereof, and said oxide obstructing the flow of said current from the narrow end of the carrier to the wide end thereof.

3. The elements of claim 1, said oxide having a crystalline formation, and the crystals thereof being successively graded in size on the said surface in the direction from the electrode having the larger area of contact to the other electrode, the coarser crystals being disposed nearer to the electrode having the said larger area of contact.

4. The elements of claim 1, said carrier having the shape of a tapered plate, which has one or both surfaces thereof covered by said layer, and said electrodes being substantially flat and applied to said layer at the opposite ends of said plate.

5. The elements of claim 1, said carrier having the shape of a tapered pin, the tapered surface thereof being covered by said layer and said electrodes being applied to said layer at said ends.

6. The elements of claim 1, said carrier having the shape of a tapered pin, the tapered surface whereof is covered by said layer, said electrodes being applied to said layer at said ends, said pin having a cavity formed at the wider end thereof coaxially with said pin, said oxide having a crystalline formation and the crystals thereof being successively graded in size on the said surface in the direction from the wider end of said pin to the narrow end of the latter, and said cavity being disposed to assist during the operation of quenching in having said crystals arranged with the coarser crystals near the wider end of the said pin.

7. In an electric current rectifying device a tapered carrier made of a copper element, a layer consisting mainly of cuprous oxide on the surface of said carrier and a pair of contacting electrodes applied to the said layer at the opposite ends of said carrier, the electrode at the wide end of the carrier to receive a current and the electrode at the narrow end of the carrier to discharge the current, said oxide permitting the current readily to flow therealong from the wide end of the carrier towards the narrow end thereof, and said oxide obstructing the flow of the current from the narrow end of the carrier towards the wide end thereof.

8. The elements of claim 7, said carrier having thereon at the narrow end thereof an enlarged ear and a small neck positioned inwardly of said ear, said ear having one of said electrodes applied thereto, and said neck serving to obstruct the flow of the current from the electrode on said ear toward the other electrode in a direction from the narrow end of the carrier towards the wide end thereof.

9. An asymmetric conductor comprising a tapered carrier made of a copper element, a layer consisting mainly of cuprous oxide on the surface of said carrier, a pair of contacting electrodes applied to the said layer at the opposite ends of said carrier, the electrode at the wide end of the carrier to receive a current and the electrode at the narrow end of the carrier to discharge the current, said oxide permitting the current readily to flow therealong from the wide end of the carrier towards the narrow end thereof and said oxide obstructing the flow of the current in the opposite direction, and a superimposed layer of cupric oxide on the said layer of cuprous oxide, portions of the layer of cupric oxide being omitted to provide contacting areas for the said contacting electrodes, said layer of cupric oxide serving to insulate the said carrier from adjacent similar carriers when assembled with the latter into a series.

MEYER LAZARUS.